(12) United States Patent
Ackermann et al.

(10) Patent No.: US 6,739,300 B2
(45) Date of Patent: May 25, 2004

(54) METHOD OF STARTING A MULTI-CYLINDER INTERNAL COMBUSTION ENGINE WITHOUT USING A STARTER MOTOR

(75) Inventors: Manfred Ackermann, Oppenweiler (DE); Udo Sieber, Bietigheim (DE)

(73) Assignee: Robert Bosch GmbH, Stuttgart (DE)

( * ) Notice: Subject to any disclaimer, the term of this patent is extended or adjusted under 35 U.S.C. 154(b) by 139 days.

(21) Appl. No.: 10/096,544

(22) Filed: Mar. 13, 2002

(65) Prior Publication Data

US 2002/0166531 A1 Nov. 14, 2002

(51) Int. Cl.[7] .............................................. F02N 17/00
(52) U.S. Cl. ..................................... 123/179.5; 123/305
(58) Field of Search ................................. 123/294, 295, 123/305, 179.1, 179.5, 179.16; 701/105

(56) References Cited

U.S. PATENT DOCUMENTS

| | | | | |
|---|---|---|---|---|
| 6,089,206 A | * | 7/2000 | Suzuki et al. | 123/295 |
| 6,202,624 B1 | * | 3/2001 | Stuerz et al. | 123/295 |
| 6,209,516 B1 | * | 4/2001 | Yamashita | 123/305 |
| 6,216,664 B1 | * | 4/2001 | Bochum et al. | 123/305 |
| 6,446,596 B1 | * | 9/2002 | Moser et al. | 123/295 |
| 6,539,914 B1 | * | 4/2003 | Moser et al. | 123/295 |
| 6,581,564 B2 | * | 6/2003 | Ogawa et al. | 123/295 |
| 6,588,397 B1 | * | 7/2003 | Sieber | 123/295 |

FOREIGN PATENT DOCUMENTS

| | | |
|---|---|---|
| DE | 197 42 969 | 4/2000 |
| DE | 197 43 492 | 4/2000 |
| DE | 198 50 142 | 5/2000 |
| DE | 100 20 104 | 10/2001 |

\* cited by examiner

*Primary Examiner*—John Kwon
(74) *Attorney, Agent, or Firm*—Kenyon & Kenyon

(57) ABSTRACT

A method of starting a multi-cylinder, direct-injection, internal combustion engine of a motor vehicle in particular without using a starter motor is described. The position of a piston in a cylinder of the internal combustion engine is determined, and fuel is injected into a combustion chamber of the cylinder whose piston is in a working phase, and the fuel is ignited immediately thereafter, thus triggering the starting operation. To improve the processing of the mixture during the starting operation, as the starting operation continues, immediately after ignition of the fuel in the cylinder which is in the working phase, fuel is injected into a combustion chamber of another cylinder whose piston is in an intake phase, and the injected fuel is ignited while still in the intake phase.

15 Claims, 3 Drawing Sheets

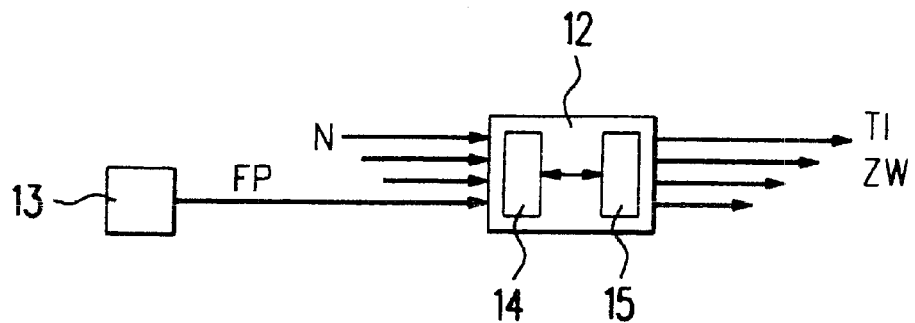
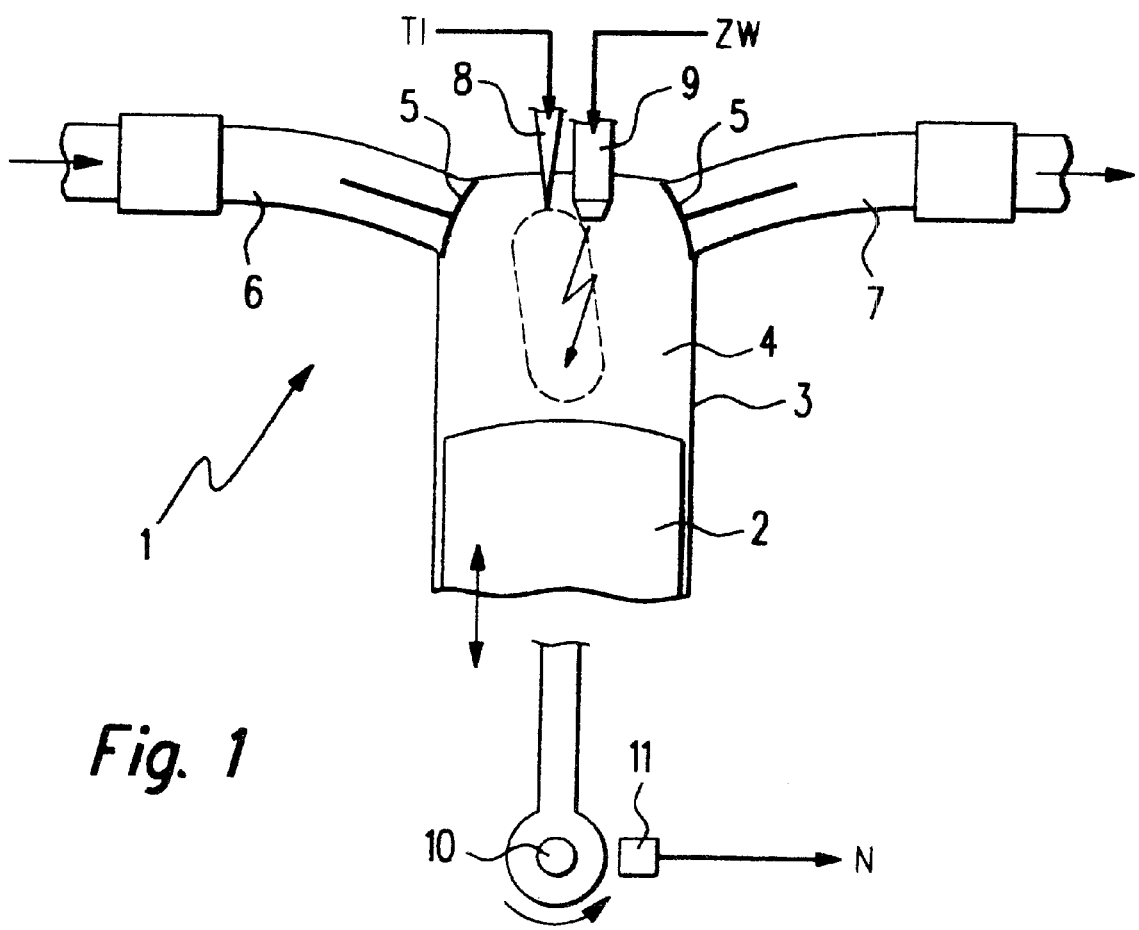
Fig. 1

METHOD OF STARTING A MULTI-CYLINDER INTERNAL COMBUSTION ENGINE WITHOUT USING A STARTER MOTOR

FIELD OF THE INVENTION

The present invention relates to a method of starting a multi-cylinder, direct-injection, internal combustion engine, in particular of a motor vehicle, without using a starter motor. The position of a piston in a cylinder of the internal combustion engine is determined and fuel is injected into a combustion chamber of the cylinder whose piston is in the working phase, and the fuel is ignited immediately thereafter. This triggers the starting operation.

The present invention also relates to a memory element, in particular a read-only memory, a random-access memory or a flash memory for a control unit of an internal combustion engine, in particular in a motor vehicle. A computer program which is capable of running on a computing element, in particular on a microprocessor, is stored in the memory element.

The present invention also relates to a computer program capable of running on a computing element, in particular a microprocessor.

The present invention also relates to a direct-injection, multi-cylinder, internal combustion engine, in particular in a motor vehicle. The internal combustion engine provides for determining the position of a piston in a cylinder of the internal combustion engine, a fuel metering system for injection of fuel into a combustion chamber of the cylinder whose piston is in a working phase, and an ignition arrangement for igniting the fuel injected into the cylinder immediately after injection. This triggers the starting operation.

Finally, the present invention relates to a control unit of a direct-injection, multi-cylinder, internal combustion engine, in particular in a motor vehicle. The internal combustion engine provides for determining the position of a piston in a cylinder of the internal combustion engine, a fuel metering system for injection of fuel into a combustion chamber of a cylinder and an ignition arrangement for igniting the fuel injected into the cylinder at a preselectable time. The control unit controls the determining of the position of a piston, the fuel metering system and the ignition means for triggering the starting operation, so that the fuel metering system injects fuel into a combustion chamber of the cylinder whose piston is in a working phase, and the ignition arrangement ignites the fuel injected into the cylinder immediately after injection.

BACKGROUND INFORMATION

German Published Patent Application No. 197 42 969 describes a method of starting a multi-cylinder, direct-injection, internal combustion engine in which the serial injection sequence of the internal combustion engine is canceled by a parallel connection of working cycles via a suitable valve control for a rapid torque buildup. To this end, the internal combustion engine has intake and exhaust valves that are freely operable, inasmuch as allowed by free travel of the valves.

During at least one revolution of the crankshaft of the internal combustion engine, the intake valves of the cylinders whose pistons are at top dead center at the same time are opened. After executing an intake stroke and compression stroke, the compressed fuel in the combustion chambers of these cylinders is ignited simultaneously. Thus, two cylinders go through the working phase at the same time. Following the working stroke, the combustion gases are ejected through the exhaust valves of the cylinders which are opened at the same time. In this method, however, the starting operation is not accomplished by combustion in the cylinders but instead by an electric starter motor which is provided separately. It executes an intake stroke and/or a compression stroke before the first ignition.

A method of starting an internal combustion engine of the type described above without using a starter motor is described in German Published Patent Application No. 100 20 104, for example. In the method described, no intake stroke or compression stroke is carried out before the first ignition, and instead the starting operation is triggered by the ignition alone. The advantage of such a direct start of the internal combustion engine is in particular that it is possible to eliminate an electric drive motor for the start or for execution of an intake stroke and/or a compression stroke before the first ignition. Due to the absence of a compression stroke before the first ignition, however, an effective mechanism for preparing a fuel/air mixture contained in the combustion chamber is omitted.

Therefore, there is a need to improve upon the processing of the mixture at the beginning of the starting operation in the case of direct start of a multi-cylinder, direct-injection, internal combustion engine without using a starter motor.

SUMMARY OF THE INVENTION

The present invention proposes that as the starting operation continues immediately after ignition of fuel in the cylinder which is in the working phase, fuel is injected into a combustion chamber of another cylinder where the piston is in an intake phase, and the injected fuel is ignited while still in the intake phase.

The method according to the present invention is suitable for starting a direct-injection internal combustion engine having at least two cylinders without using a starter motor. Prior to beginning the method, the position of the rotation angle crankshaft of the internal combustion engine, i.e., the position of the pistons in the cylinders of the internal combustion engine, is determined. In the case of an internal combustion engine having four or more cylinders, the piston of at least one cylinder will be in the working phase. If in the case of an internal combustion engine having fewer than four cylinders, no piston of a cylinder is in the working phase, the intake and exhaust valves of the cylinder which is in the intake phase are brought into a position corresponding to the working phase, i.e., the intake and exhaust valves are closed.

For free operation of the intake and exhaust valves, a camshaft-free control is provided, for example, with which each intake and exhaust valve may be controlled separately from the other valves and independently of the position of the camshaft. For camshaft-free control, the intake and/or exhaust valves are equipped with a regulating unit either individually or jointly for a plurality of valves. The regulating unit may be actuated hydraulically, piezoelectrically, electromagnetically or by some other method. A plurality of camshaft-free controls for intake and exhaust valves are described from related art and may be used in conjunction with the present invention.

As an alternative, the intake and exhaust valves may have, e.g., a variable camshaft control element on the intake side and a variable valve lift for free actuation. It is thus possible to adjust the intake camshaft so that the intake valves are opened briefly in the intake phase only at the beginning and are thus brought into a position corresponding to the working phase. In this way, earlier closing of the intake may be set on the intake side.

Fuel is injected into the combustion chamber of the cylinder which is in the working phase, and the fuel is ignited immediately thereafter, thus starting the initial rotary motion of the internal combustion engine which thus triggers the starting operation. As the starting operation continues, fuel is injected into the combustion chamber of another cylinder in which the piston is in an intake phase immediately after ignition of the fuel/air mixture in the cylinder which is in the working phase. To further accelerate the rotary motion of the internal combustion engine, fuel injected into the combustion chamber of the additional cylinder is ignited while still in the intake phase.

Injection of fuel into the combustion chamber of a cylinder in the intake phase before the second combustion has a positive effect on preparing the mixture for the second combustion. At the start of the intake phase of a cylinder, the injector of the cylinder is opened to allow air to be drawn into the combustion chamber of the cylinder. Due to the intake of air through the intake valve, swirls develop in the combustion chamber of the cylinder and persist for a short period of time even after the intake valve has been closed. Fuel to be injected into the combustion chamber before the second ignition is injected into the swirls, thus resulting in an especially homogeneous mixture of fuel and air in the combustion chamber. Thus, in homogeneous operation, fuel is injected before the second ignition. The intake valve of the cylinder in the intake phase may be closed immediately before, during or even just after the injection of fuel. The method according to the present invention may also be used with internal combustion engines having multiple intake and/or exhaust valves per cylinder. To carry out the method according to the present invention, it is sufficient if at least one of the intake or exhaust valves is operated accordingly.

After ignition of the fuel/air mixture, especially good combustion is made possible due to the homogeneous distribution of the fuel/air mixture in the combustion chamber of the additional cylinder, so that with the second combustion an especially high torque may be transmitted to the crankshaft of the internal combustion engine. It has been found that when starting an engine without using a starter motor, the function of the first combustion is mainly to start the initial rotary motion of the crankshaft. However, the second combustion in particular is crucial for the success or failure of starting the engine without a starter motor. In the method according to the present invention, this second combustion may be improved significantly, so that secure and reliable starting of an internal combustion engine without using a starter motor is made possible.

According to an embodiment of the present invention, it is proposed that an intake valve of the additional cylinder in the intake phase shall be kept open during the fuel injection and shall be closed only shortly before ignition of the fuel. In this way, the turbulence in the combustion chamber of the additional cylinder is maintained to the full extent even during the injection of fuel. This yields an especially homogeneous distribution of the fuel/air mixture in the combustion chamber and subsequently complete combustion.

According to a another embodiment of the present invention, it is proposed that as the starting operation continues, fuel shall be injected into the combustion chambers of cylinders in either an intake phase or a compression phase and that the fuel compressed in the combustion chambers shall be ignited. The fuel/air mixture is thus ignited toward the end of the compression phase, just before reaching or just after passing top dead center. In this way, a third combustion and additional combustions are achieved, continuing and completing the starting operation of the internal combustion engine which has been initiated by the second combustion. The prerequisite for injection of fuel during the compression phase is that the fuel in the fuel metering system of the internal combustion engine should be available at a sufficiently high pressure. A sufficiently high injection pressure may be generated by using a high-pressure pump operated electrically, for example, independently of the internal combustion engine.

The fuel mass to be injected into the combustion chamber of the cylinder in the working phase at the beginning of the starting operation may be metered to yield an excess of oxygen for the first combustion. Because of the parallelism of the working cycles at the beginning of the starting operation, the cylinder which was in the working phase at the beginning of the starting operation is switched directly to a compression phase. No charge cycle may take place before the compression phase. Because of the oxygen excess during the first combustion, oxygen is still present in the combustion chamber of the cylinder after the first combustion, and together with fuel injected during the compression phase, it forms an ignitable fuel/air mixture. The high oxygen excess for the first combustion may be achieved through a stratified charge, for example.

After a first rotary motion of the internal combustion engine, one exhaust valve may be opened first by ignition and combustion of the fuel injected into the combustion chamber of the cylinder in the working phase before reaching a bottom dead center (UT), and then the exhaust valve is closed and an intake valve is opened before reaching the bottom dead center (UT). In this way, it is possible for oxygen to flow in before the start of the next compression in the cylinder, thus resulting in a clear improvement in combustion of the fuel/air mixture.

According to another embodiment of the present invention, it is proposed that fuel shall be injected into the combustion chambers of the cylinders during the starting operation at a pressure generated by a booster pump of the internal combustion engine. The pressure generated by a booster pump designed as an electric fuel pump (EKP) is also known as rail pressure EKP. In the case of internal combustion engines having a high-pressure pump driven as a function of the internal combustion engine or driven by the camshaft, fuel may be injected at rail pressure EKP during a starting operation without using a starter motor.

As an alternative, according to another embodiment of the present invention, it is proposed that fuel shall be injected into the combustion chambers of the cylinders during the starting operation at an injection pressure generated by a high-pressure pump of the internal combustion engine. Fuel may thus also be injected into the combustion chamber of the cylinder with no problem during the compression phase of the internal combustion engine. The injection pressure is generated by a high-pressure pump driven independently of the internal combustion engine, e.g., electrically.

Another embodiment of the method according to the present invention is in the form of a memory element which is provided for a control unit of an internal combustion engine, in particular in a motor vehicle. A computer program capable of running on a computing element, in particular on a microprocessor, and suitable for execution of the method according to the present invention is stored in the memory element. In this case, the present invention is thus implemented by a computer program stored on the memory element, so that this memory element provided with the computer program likewise represents the present invention as well as the method for whose execution the program is suitable. In particular an electric memory medium may be used as the memory element, e.g., a read-only memory, a random-access memory or a flash memory.

The present invention also relates to a computer program suitable for carrying out the method according to the present invention when it is run on a computing element, in particular a microprocessor. The computer program may be stored in a memory element, in particular a flash memory.

It is proposed on the basis of a direct-injection, multi-cylinder, internal combustion engine that immediately after ignition of the fuel in the cylinder in the working phase, as the starting operation continues, the fuel metering system injects fuel into a combustion chamber of another cylinder where the piston is in an intake phase, and the ignition arrangement ignites the injected fuel while still in the intake phase.

According to another embodiment of the present invention, it is proposed that the internal combustion engine shall provide for executing the method according to the present invention.

As yet another embodiment to achieve the object of the present invention, starting from a control unit of a direct-injection, multi-cylinder, internal combustion engine, it is proposed that immediately after ignition of the fuel in the cylinder in the working phase, the control unit shall control the determining of the position of a piston, the fuel metering system and the ignition means as the starting operation continues, the fuel metering system shall inject fuel into a combustion chamber of another cylinder which has a piston in an intake phase, and the ignition arrangement shall ignite the injected fuel while still in the intake phase.

According to another embodiment of the present invention, it is proposed that the control unit shall provide for executing the method according to the present invention.

BRIEF DESCRIPTION OF THE DRAWINGS

FIG. 1 is a schematic block diagram of an internal combustion engine according to the present invention in a motor vehicle according to an example embodiment.

DETAILED DESCRIPTION

Figure 2:
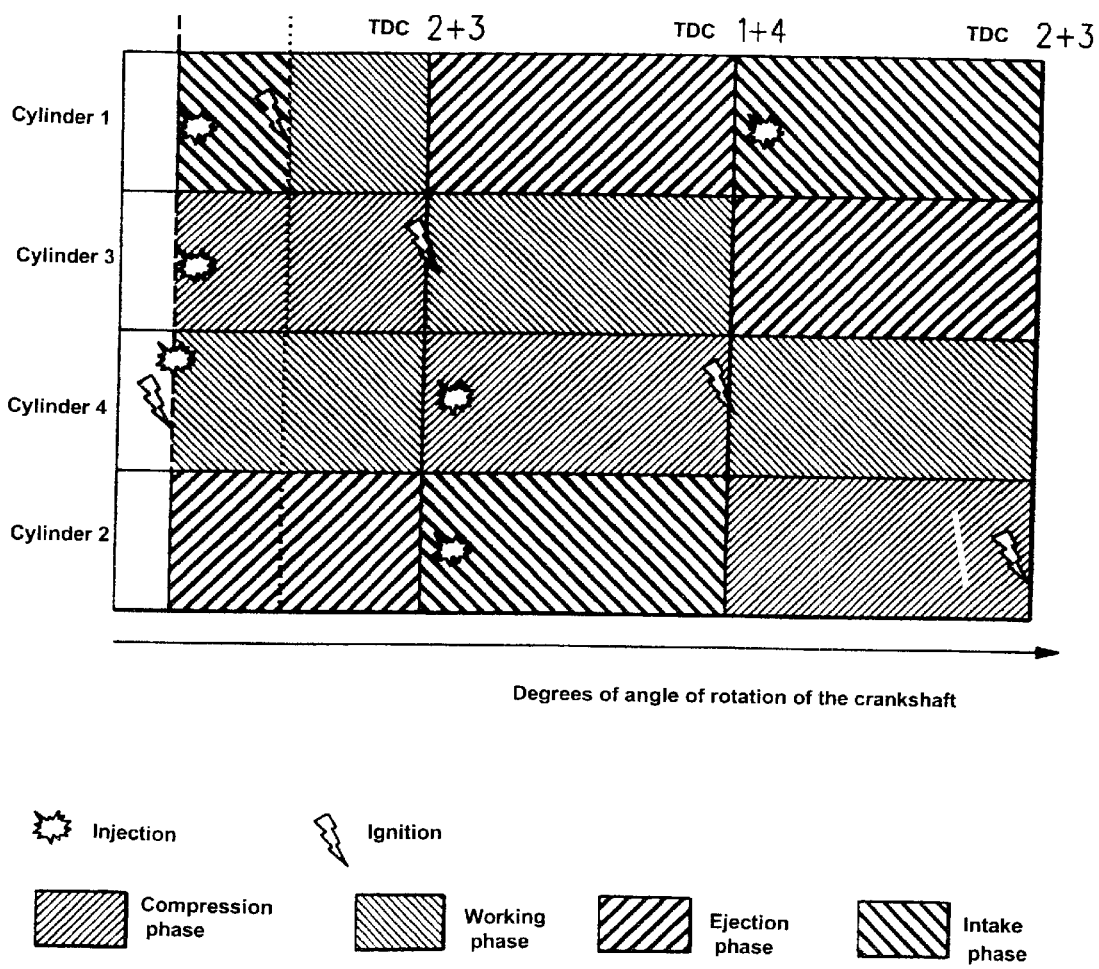
FIG. 2 is a schematic diagram of a first embodiment of a method according to the present invention for starting the internal combustion engine from FIG. 1.

FIG. 1 illustrates an internal combustion engine labeled as 1 as a whole. Internal combustion engine 1 has a piston 2, which is movable back and forth in a cylinder 3. Cylinder 3 has a combustion chamber 4 to which are connected an intake manifold 6 (intake valve) and a tailpipe 7 (outlet valve) through charge valves 5. In addition, an injector 8, controllable by a signal TI, and a spark plug 9 controllable by a signal ZW are provided for combustion chamber 4. Internal combustion engine 1 may be switched back and forth between different modes of operation.

In a first operating mode, stratified charge operation of internal combustion engine 1, fuel is injected by injector 8 into combustion chamber 4 during a combustion phase triggered by piston 2, namely into the immediate environment of spark plug 9 and immediately before top dead center OT of piston 2 or before the ignition point. Then the fuel is ignited with the help of spark plug 9, so that piston 2 is driven by the expansion of the ignited fuel in the subsequent working phase.

In a second operating mode, homogeneous operation of internal combustion engine 1, fuel is injected into combustion chamber 4 by injector 8 during an intake phase triggered by piston 2. Turbulence is created in the injected fuel by the simultaneous air intake, and therefore the fuel in combustion chamber 4 is distributed much more uniformly (homogeneously). Then the fuel/air mixture is compressed during the compression phase and subsequently ignited by spark plug 9. Piston 2 is driven by the expansion of the ignited fuel.

In stratified charge operation and in homogeneous operation, a crankshaft 10 is set in rotary motion by driven piston 2, ultimately driving the wheels of the motor vehicle. Crankshaft 10 is provided with an rpm sensor 11 which generates a signal N as a function of the rotary motion of crankshaft 10.

In stratified charge operation and in homogeneous operation, fuel is injected by fuel injector 8 into combustion chamber 4 under a high pressure. To this end, an electric fuel pump is provided as a booster pump and a high-pressure pump (booster pump and high-pressure pump not shown), the latter being driven by internal combustion engine 1 or an electric motor. The electric fuel pump (EKP) is driven independently of internal combustion engine 1 and generates a rail pressure EKP of at least 3 bar, and the high-pressure pump generates a rail pressure HD of up to approx. 200 bar. In the case of self-igniting internal combustion engines, the pressures generated are much higher.

The fuel mass injected by fuel injector 8 into combustion chamber 4 in stratified charge operation and in homogeneous operation is controlled and/or regulated by a control unit 12, in particular with regard to low fuel consumption and/or low pollutant emission. To this end, control unit 12 is provided with a microprocessor 14 which has a computer program stored in a memory element, in particular in a flash memory 15, the program being suitable for carrying out the control and/or regulation described above. To carry out the method according to the present invention, either a separate computer program which is capable of running on microprocessor 14 is stored in flash memory 15 or the existing computer program is expanded in a suitable manner.

Control unit 12 receives input signals which represent operating quantities of internal combustion engine 1 measured by sensors. For example, control unit 12 is connected to an air mass sensor situated in intake manifold 6, a lambda sensor situated in tailpipe 7 and/or rpm sensor 11. In addition, control unit 12 is also connected to a gas pedal sensor 13 which generates a signal FP indicating the position of a gas pedal operated by the driver. Control unit 12 generates output signals with which the performance of internal combustion engine 1 may be influenced according to the desired control and/or regulation via actuators or final control elements. For example, control unit 12 is connected to injector 8 and spark plug 9 and generates signals TI, ZW required for their control.

FIG. 2 illustrates schematically in the form of a diagram a method according to the present invention for starting a direct-injection, four-cylinder, internal combustion engine 1 without using a starter motor. The individual lines of the diagram refer to respective cylinder 3 of internal combustion engine 1. Various cylinders 3 are labeled. The individual columns of the diagram refer to the phases or cycles of piston 2 of respective cylinder 3. Each piston 2 may be in an intake phase, a compression phase, a working phase or an ejection phase. The transitions between the individual phases are characterized by top dead centers OT of pistons 2. To this extent, the horizontal axis along the various phases of piston 2 represents an angle of rotation °KW of crankshaft 10. The position of internal combustion engine 1 before the start, i.e., the position when internal combustion engine 1 is at a standstill, is indicated with broken lines.

In the method illustrated in FIG. 2 and described below, rpm sensor 11 is designed as an absolute angle sensor. This means that rpm sensor 11 generates angle of rotation °KW at any time, in particular even after a standstill of internal combustion engine 1, and sends it to control unit 12. In this way, the position of piston 2 in cylinders 3 may be determined before the beginning of the starting operation. As an alternative, crankshaft 10 may also be set in the required rotation by an electric starter motor, so that rpm sensor 11 may signal the position of piston 2.

In the method according to FIG. 2, cylinder no. 4 is in its working phase (intake and exhaust valves 5 closed, the position of piston 2 after OT) when internal combustion engine 1 is at a standstill. Cylinder no. 4 is the starting cylinder. At the beginning of the starting operation, fuel is injected into combustion chamber 4 of cylinder no. 4. If the high-pressure pump is driven as a function of internal combustion engine 1, fuel is injected only at rail pressure EKP of the electric fuel pump. Otherwise, i.e., the high-pressure pump is driven independently of internal combustion engine 1, fuel is injected into combustion chamber 4 under high pressure HD for the purpose of processing the mixture. Immediately after this injection, the injected fuel or the fuel/air mixture present in combustion chamber 4 is ignited. This results in an initial combustion which induces an initial forward rotary motion of crankshaft 10.

Immediately after the beginning of rotation, fuel is injected into cylinder no. 1 which is in the intake phase, i.e., the intake valve is opened and the exhaust valve is closed. Then the injected fuel is ignited while still in the intake phase, and the intake valve is closed immediately before ignition. The closing time of the intake valve is illustrated in FIG. 2 by the perpendicular dotted line immediately before ignition in cylinder no. 1. Ignition results in a second combustion, which accelerates the rotary motion of crankshaft 10. It has been found that the second combustion in particular plays a significant role in the success or failure of the starting operation.

During the intake phase, air is drawn out of intake manifold 6 into combustion chamber 4 of cylinder 3 through the opened intake valve. The air current of the intake air creates strong swirls in combustion chamber 4, resulting in mixing of the injected fuel with the intake air. Because of injection during the intake phase, a homogeneous fuel/air mixture is thus formed in combustion chamber 4 of cylinder no. 1 and burns completely after ignition. In the method according to the present invention, a high torque is transmitted to crankshaft 10 by the second combustion, thus permitting reliable and safe starting of internal combustion engine 1 without using a starter motor.

The intake valve may remain open during the injection of fuel. However, it is also possible for the intake valve to close before or during injection. After the intake valve has closed, the air turbulence subsides gradually, so that a sufficiently good mixing of the fuel/air mixture is ensured in the intake phase even in the case of fuel injection with the intake valve closed.

While cylinder no. 1 is in the intake phase, fuel is injected into cylinder no. 3, which is in the compression phase, in which the intake and exhaust valves are closed, and the fuel is ignited at the end of the compression phase or after passing top dead center OT at the beginning of the working phase. Additional injections, ignitions, and positions of valves 5 are illustrated in the diagram using the example of cylinder no. 4, cylinder no. 2 and cylinder no. 1. Thus the additional injections take place during the intake phase of respective cylinder 3 (cylinder no. 2 and cylinder no. 1) and during the compression phase (cylinder no. 4). The injected fuel is ignited toward the end of the compression phase shortly before or shortly after reaching top dead center OT.

To be able to inject fuel into combustion chamber 4 of cylinder no. 4 during the compression phase, the fuel to be injected may be available at injector 8 with a high injection pressure. Such a high injection pressure may be produced, for example, by a high-pressure pump driven independently of internal combustion engine 1 (e.g., electrically). To be able to inject fuel into the combustion chamber of cylinder no. 2 and cylinder no. 1 during the intake phase, a lower injection pressure is sufficient, e.g., rail pressure EKP produced by an electric fuel pump.

During the preceding working cycle, there may not be any charge cycle in cylinder no. 4 because of the simultaneity of the working cycles. Thus, in deviation from the otherwise customary sequence of working cycles, cylinder no. 4 goes from the working phase directly into the compression phase. There is no ejection phase and no intake phase. To nevertheless achieve an ignitable fuel/air mixture, a high oxygen excess is provided for the first combustion accordingly, so that after the first combustion, oxygen for further combustion is still present in the combustion chamber of cylinder no. 4. The oxygen excess may be achieved by stratified charge operation, for example.

As an alternative, after an initial rotary motion of the internal combustion engine because of ignition and combustion of the fuel injected into combustion chamber 4 of cylinder no. 4, exhaust valve 5 in cylinder no. 4 may be opened before reaching a bottom dead center UT, and then exhaust valve 5 may be closed again and intake valve 5 opened just before reaching bottom dead center UT. Bottom dead center UT of cylinder no. 1 and cylinder no. 4 corresponds to top dead center OT of cylinder no. 2 and cylinder no. 3. Likewise, bottom dead center UT of cylinder no. 2 and cylinder no. 3 corresponds to top dead center OT of cylinder no. 1 and cylinder no. 4.

Intake and exhaust valves 5 of combustion chamber 4 are adjusted using camshaft-free control. To do so, each intake and exhaust valve 5 is equipped with its own control element. In this way, valves 5 may be opened and closed independently and freely—if allowed by free travel of the valve. In this way, it is possible to switch from an intake phase to a working phase and vice versa. Accordingly, it is possible to change from a compression phase to an exhaust phase and vice versa. Because of the camshaft-free control of valves 5, intake and/or exhaust valves 5 may be brought into a predetermined position at the beginning of the starting operation to create optimum conditions for starting internal combustion engine 1 without using an electric starter motor.

To reduce compression resistance during the starting operation according to the present invention, each compression phase may be shortened suitably by early or late closing of corresponding intake valves 5 (which are opened during the intake phase taking place before the compression phase). The method described here may also be used with appropriate modification for internal combustion engines 1 having more than four cylinders.

The embodiment of the method according to the present invention described here may also be used with suitable modifications for internal combustion engines 1 having more than four cylinders. In internal combustion engines 1 having less than four cylinders, the case may occur that none of pistons 2 is in its working phase at the beginning of the starting operation. In this case, however, at least piston 2 of cylinder 3 will definitely be in its intake phase. Then the intake valve or each intake valve of corresponding cylinder 3 may be closed, and cylinder 3 may be switched from the intake phase to the working phase. Again in this case, internal combustion engine 1 may thus be started without using an electric starter motor.

Figure 3:
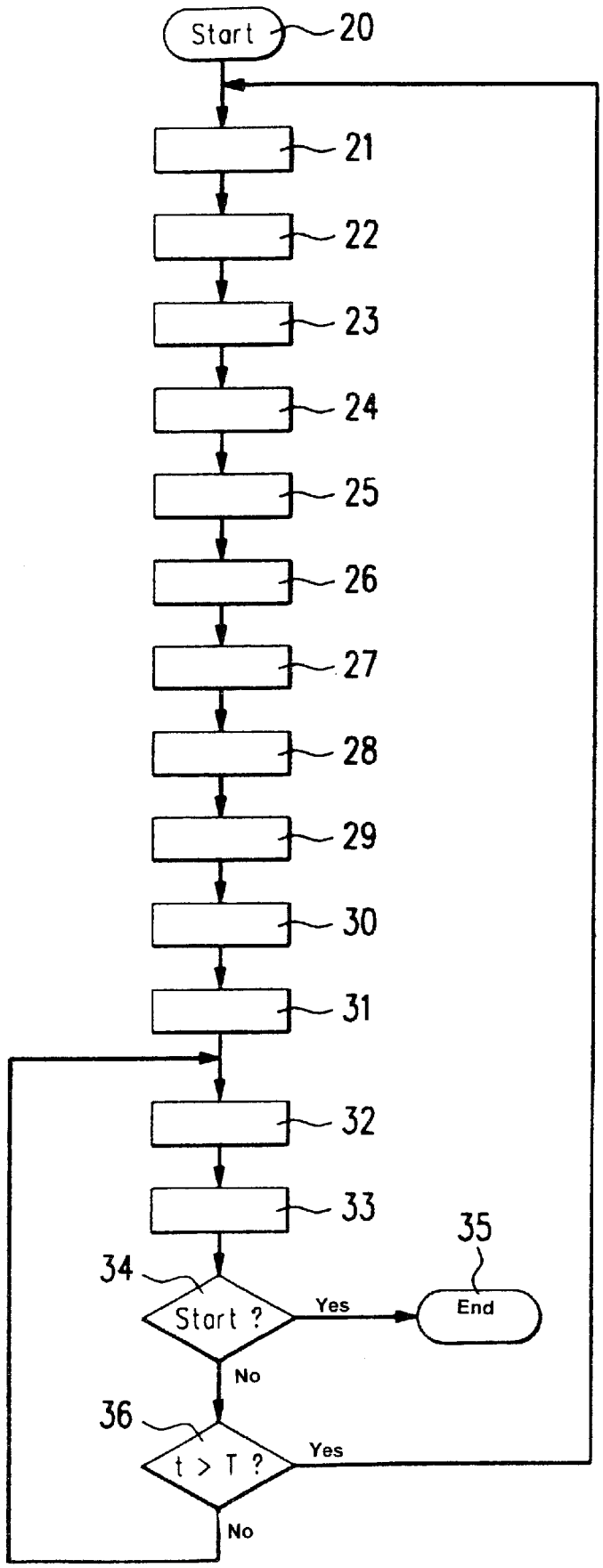
FIG. 3 is a flow chart of the method according to the present invention from FIG. 2.

FIG. 3 shows a flow chart of the method according to the present invention. The method begins in a function block 20. In a function block 21, starting of internal combustion engine 1 is requested. To do so, the position of piston 2 in cylinders 3 of internal combustion engine 1 is determined in a function block 22, e.g., on the basis of the rotational position of crankshaft 10. In a function block 23, fuel is then injected into a combustion chamber 4 of cylinder 3 (cylinder no. 4) when the piston 2 is in a working phase. Immediately thereafter, the injected fuel is ignited in a function block 24. Due to this initial combustion, a rotary motion is induced in crankshaft 10 and the starting operation is initiated.

Following the ignition of the fuel injected into combustion chamber 4 of cylinder no. 4, fuel is injected in a function block 25 into the combustion chamber of another cylinder 3 (cylinder no. 1) which is in the intake phase. During fuel injection, the intake valve of cylinder no. 1 continues to remain open. Toward the end of the intake phase, however, the intake valve is closed in a function block 26. While cylinder no. 1 is in the intake phase, in a function block 27, fuel is injected into yet another cylinder 3 (cylinder no. 3) which is in the compression phase. Thereafter, in a function block 28, the fuel injected into cylinder no. 1 is ignited before reaching bottom dead center UT. Due to this second combustion, the rotary motion of the crankshaft is accelerated. A good second combustion is important for a successful starting operation. Ignition of the fuel injected into cylinder no. 3 takes place in a function block 28 toward the end of the compression phase, shortly before or shortly after reaching top dead center OT. The rotary motion of crankshaft 10 is further accelerated by the third combustion.

During a subsequent working cycle, in a function block 29, fuel is injected into a cylinder 3 (cylinder no. 4) which is in the compression phase. During the same working cycle, in a function block 30, fuel is injected into a cylinder 3 (cylinder no. 2) which is in the intake phase. In a function block 31, the fuel injected into combustion chamber 4 of cylinder no. 4 is ignited toward the end of the compression phase. In the following working cycles, in a function block 32, fuel is injected into a cylinder 3 which is in the intake phase. The injected fuel is ignited in a function block 33. In a query block 34, a check is performed to determine whether the start of internal combustion engine 1 has been successful. If the answer is in the affirmative, the method according to the present invention is terminated in a function block 35. If the answer is in the negative, the method branches off to a query block 36 where a check is performed to determine whether a preselectable time value T has been exceeded without internal combustion engine 1 being started. If the answer is in the affirmative, the method branches off to function block 21 and the starting operation is repeated again from the beginning. If the answer is in the negative, the method branches off to function block 32 and the starting operation is continued by injecting fuel into cylinder 3, which is in the intake phase, and then igniting it again.

What is claimed is:

1. A method for starting a multi-cylinder, direct-injection, internal combustion engine of a motor vehicle without using a starting motor, comprising:
   determining a position of a piston in a working phase in a cylinder of the internal combustion engine;
   injecting a fuel into a combustion chamber for the piston in the working phase;
   immediately thereafter, igniting the fuel in the combustion chamber to trigger a starting operation; and
   as the starting operation continues, immediately after an ignition of the fuel in the cylinder in the working phase, injecting the fuel into a combustion chamber of another cylinder that includes a piston that is in an intake phase and igniting the fuel while still in the intake phase.

2. The method according to claim 1, further comprising:
   keeping open an intake valve of the other cylinder in the intake phase during a fuel injection; and
   closing the intake valve only shortly before the ignition of the fuel.

3. The method according to claim 1, further comprising:
   injecting the fuel into the combustion chamber of the cylinder as the starting operation continues, wherein the cylinder is in one of the intake phase and a compression phase;
   compressing the fuel in the combustion chambers; and
   igniting the fuel in the combustion chambers.

4. The method according to claim 1, further comprising:
   metering a fuel mass to be injected into the combustion chamber of the piston in the working phase at a beginning of the starting operation to provide an excess of oxygen for a first combustion.

5. The method according to claim 1, further comprising:
   opening an exhaust valve of the cylinder after a first rotary motion of the internal combustion engine due to ignition and combustion of the fuel injected into the combustion chamber of the cylinder in the working phase before the piston reaches bottom dead center; and
   closing the exhaust valve and opening an intake valve before the piston reaches bottom dead center.

6. The method according to claim 1, further comprising:
   during the starting operation, injecting the fuel into the combustion chamber of the cylinder at a pressure that is generated by a booster pump of the internal combustion engine.

7. The method according to claim 1, further comprising:
   during the starting operation, injecting the fuel into the combustion chamber of the cylinder at an injection pressure that is generated by a high-pressure pump of the internal combustion engine.

8. A memory element arranged in a control unit of an internal combustion engine and for storing a computer program that when executed on a computing element causes a performance of:
   determining a position of a piston in a working phase in a cylinder of the internal combustion engine;
   injecting a fuel into a combustion chamber for the piston in the working phase;
   immediately thereafter, igniting the fuel in the combustion chamber to trigger a starting operation; and
   as the starting operation continues, immediately after an ignition of the fuel in the cylinder in the working phase, injecting the fuel into a combustion chamber of another cylinder that includes a piston that is in an intake phase and igniting the fuel while still in the intake phase.

9. The memory element according to claim 8, wherein:

the memory element includes one of a read-only memory, a random-access memory, and a flash memory, and the computing element includes a microprocessor.

10. A computer-readable medium having stored therein a computer program that when executed on a computing element causes the computing element to perform the steps of:

determining a position of a piston in a working phase in a cylinder of the internal combustion engine;

injecting a fuel into a combustion chamber for the piston in the working phase;

immediately thereafter, igniting the fuel in the combustion chamber to trigger a starting operation; and as the starting operation continues, immediately after an ignition of the fuel in the cylinder in the working phase, injecting the fuel into a combustion chamber of another cylinder that includes a piston that is in an intake phase and igniting the fuel while still in the intake phase.

11. The computer-readable medium according to claim 10, wherein:

the computer-readable medium includes a memory element corresponding to a flash memory, and the computing element includes a microprocessor.

12. A direct-injection, multi-cylinder, internal combustion engine of a motor vehicle, comprising:

an arrangement to determine a position of a piston in a cylinder of the internal combustion engine;

a fuel metering system configured to inject a fuel into a combustion chamber of the cylinder when a piston of the cylinder is in a working phase; and an ignition arrangement for igniting the fuel injected into the cylinder immediately after injection in order to trigger a starting operation, wherein, as the starting operation continues, immediately after ignition of the fuel in the cylinder in the working phase, the fuel metering system is further configured to inject the fuel into a combustion chamber of another cylinder including a piston in an intake phase, and the ignition arrangement is configured to ignite the injected fuel of the other cylinder while still in the intake phase.

13. The internal combustion engine according to claim 12, further comprising:

an arrangement for keeping open an intake valve of the other cylinder in the intake phase during a fuel injection; and an arrangement for closing the intake valve only shortly before the ignition of the fuel.

14. A control unit of a direct-injection, multi-cylinder, internal combustion engine, including an arrangement to determine a position of a piston in a cylinder of the internal combustion engine, a fuel metering system configured to inject a fuel into a combustion chamber of a cylinder, and an injection arrangement configured to ignite the fuel injected into the cylinder at a predefinable time, the control unit comprising:

a control arrangement configured to control the arrangement for determining the position of the piston, the fuel metering system, and the injection arrangement for triggering a starting operation so that the fuel metering system injects the fuel into the combustion chamber of the cylinder in which the piston thereof is in a working phase, and the ignition arrangement ignites the fuel injected into the cylinder immediately after ignition, wherein the control arrangement is further configured to control the arrangement for determining the position of the piston, the fuel metering system, and the ignition arrangement as the starting operation continues such that immediately after ignition of the fuel in the cylinder in the working phase, the fuel metering system injects fuel into a combustion chamber of another cylinder that has a piston in an intake phase, and the ignition arrangement is configured to ignite the injected fuel while still in the intake phase.

15. The control unit according to claim 14, further comprising:

an arrangement for keeping open an intake valve of the other cylinder in the intake phase during a fuel injection; and an arrangement for closing the intake valve only shortly before the ignition of the fuel.

* * * * *